July 27, 1943.    G. F. PEMBROKE    2,325,423
APPARATUS FOR TESTING OR MEASURING SIZES OR DIMENSIONS
Filed March 26, 1942    2 Sheets-Sheet 1

Inventor
George F. Pembroke
By
Watson, Cole, Grindle & Watson
Attys.

July 27, 1943. G. F. PEMBROKE 2,325,423
APPARATUS FOR TESTING OR MEASURING SIZES OR DIMENSIONS
Filed March 26, 1942 2 Sheets-Sheet 2

Patented July 27, 1943

2,325,423

UNITED STATES PATENT OFFICE 2,325,423

APPARATUS FOR TESTING OR MEASURING SIZES OR DIMENSIONS

George Frederick Pembroke, Deptford, London, England, assignor to Molins Machine Company, Limited, Deptford, London, England Application March 26, 1942, Serial No. 436,369
In Great Britain March 18, 1941

4 Claims. (Cl. 33—178)

This invention concerns improvements in or relating to apparatus for testing or measuring sizes or dimensions and has particular reference to apparatus for testing the internal dimensions of hollow articles.

According to the invention there is provided apparatus for testing the internal dimensions of hollow articles, comprising in combination, feelers movable towards and away from each other, a carrier on which the feelers are mounted, and actuating-means to effect movement of the feelers towards and away from each other, said actuating-means being also adapted to actuate indicator-mechanism according to the extent of movement of the feelers away from each other. The carrier may be pivotally mounted for movement in an arcuate path, the carrier being arrested by a stop when the feelers have been inserted into an article, and the actuating-means may include an operating lever movable about the axis of rotation of the carrier, the operating lever being movable relatively to the carrier and arranged to move the carrier against the stop and thereafter to move the feelers away from each other.

One embodiment of the invention will now be described, by way of example, with reference to the accompanying drawings which show part of a machine for testing the internal dimensions of articles and in the ensuing description the articles to be tested comprise cartridge-cases, hereinafter referred to, for convenience, as "cases."

Figure 2:
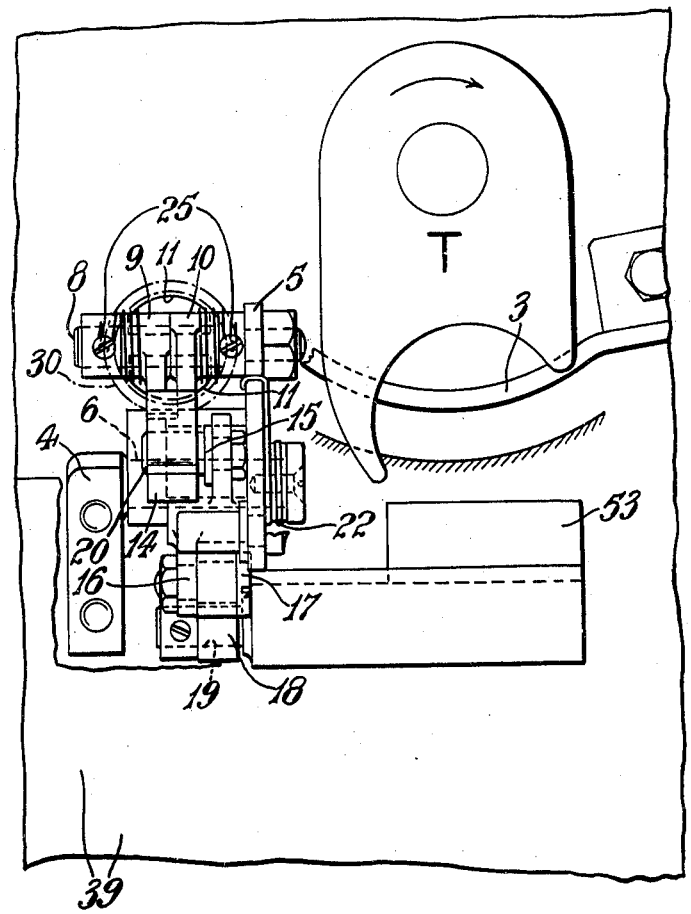
Figure 2 is a view of Figure 1 in the direction of the arrow A with part of the frame broken away.

Referring to the drawings, cases 30 are fed in succession on to V shaped supports 2 which are located at the position at which the internal dimension of the case at the open end thereof is to be tested. The mechanism for feeding the cases to the supports is preferably similar to that described in the co-pending United States Patent application No. 434,127, and is indicated in Figure 2 where a rotary transfer member T is shown.

As the cases are moved towards and on to the V shaped supports, the bases of the cases are engaged by vertical guides 3, these guides being arranged to ensure that the case is in the correct position when it is resting on the V shaped supports. Only one such guide is shown in the drawings but a similar guide is provided to control the other end of the case. At a position which is in front of the open end of a case when the latter is in position on the V shaped supports, a bracket 4 is bolted to the frame 39 of the machine. On this bracket is mounted the testing device. The testing device comprises a carrier 5 which is mounted for movement about a spindle 6 supported by the bracket. The carrier is a forked member and from one arm 7 of the fork there extends, across the fork, a second spindle 8 the axis of which is parallel to the axis of the spindle about which the carrier is movable. The arm from which the spindle extends is longer than the other arm of the fork. On this second spindle, two bell-crank levers 9 and 10 are mounted so as to be freely movable. One arm of each of the bell-crank levers has a shaped head 11 which is of segmental form and these arms of the bell-crank levers are so arranged that the straight surfaces of the segmental portions face each other. The segments are arranged one above the other and comprise feelers. The feelers are urged towards each other by springs 12 and 13 which are anchored to the screws 25, Figure 2. When the feelers are pressed towards each other, by said springs, the distance between the opposite curved surfaces thereof is less than the diameter of the case into which they are to be inserted.

The other arms of the bell-crank levers each have projections 14 extending from the flat faces thereof and these projections provide stops which prevent the bell-crank levers from being moved past each other. These other arms of the bell-crank levers provide a V shaped space into which extends an actuating-pin 15, the purpose of which will be described below.

Between the forked arms of the carrier and freely mounted on the spindle supporting the carrier, there is provided an actuating-member which comprises a bell-crank lever 16. One arm of this bell-crank supports the actuating-pin 15, referred to above. The other arm of the bell-crank lever is pivotally connected at 17 to a link 18. The other end of the link is pivoted at 19 to a sliding bar 53. The movements of the bar operate indicator-mechanism which may be similar to that referred to in the specification accompanying co-pending United States patent application No. 399,561 in the name of Felix F. Ruau. The longer arm of the forked carrier also supports a pin 20 which extends beneath that arm of the actuating bell-crank lever to which the actuating-pin 15 is fixed.

Figure 1:
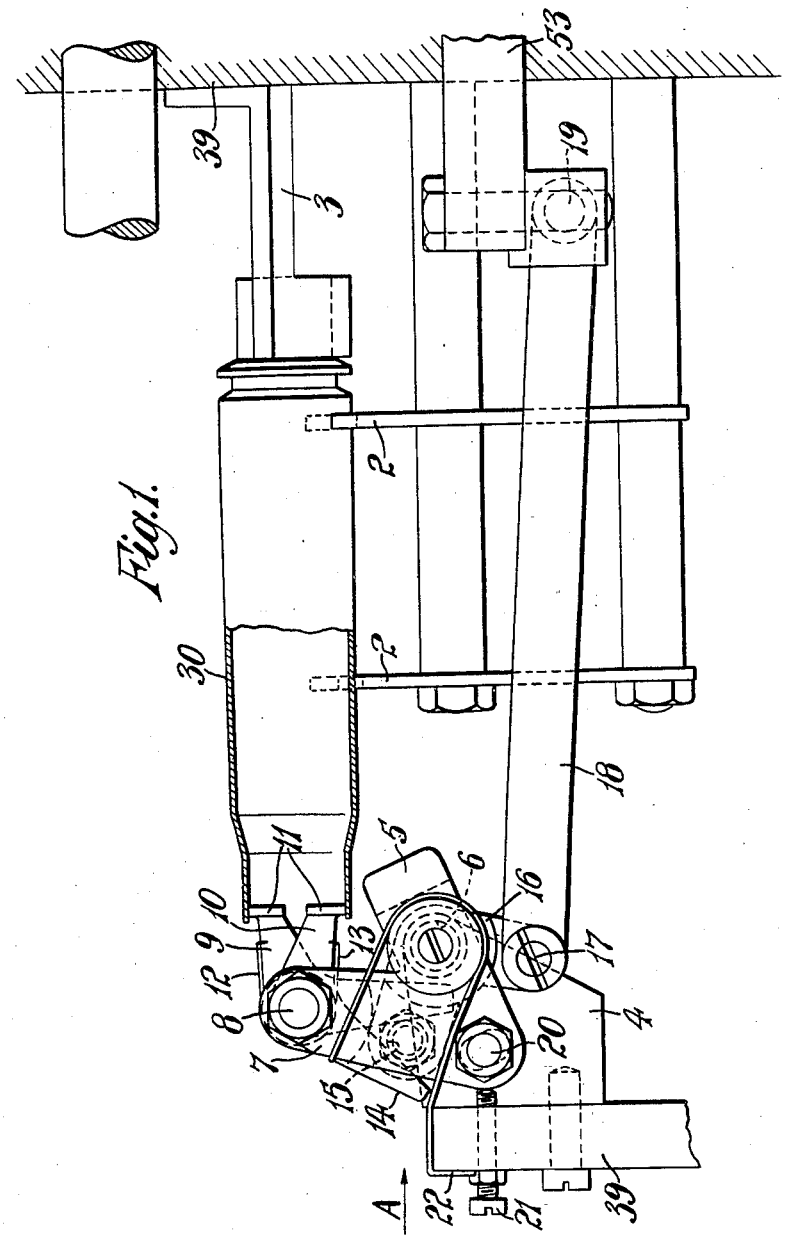
Figure 1 is a sectional side elevation of the apparatus.

On the machine frame 39 there is secured a stop screw 21, Figure 1, against which the longer arm of the carrier is arrested when the feelers are inserted into the open end of a case. A torsion spring 22 tends to rotate the carrier on the spindle 6 and move it towards the stop 21.

The operation of the testing apparatus is as follows. When a testing operation is about to commence, the carrier is held away from the stop against the action of the torsion spring 22 by means of the link connecting it with the bar 53. After a case has been properly positioned in the V shaped supports, the link rotates the actuating bell-crank lever and permits the spring 22 to rotate the carrier and feelers, until the carrier is arrested by the stop 21. When the carrier is so arrested, the feelers have been inserted into the open end of the case. Continued movement of the link causes the actuating bell-crank lever to continue its movement until the actuating-pin 15 has forced the feelers apart from each other so that the arcuate surfaces of the feelers engage opposite inner surfaces of the case. The extent of movement of the bar 53, and thus its final position, is therefore determined by the distance which the feelers are moved apart when they are moved into engagement with the opposed inner surfaces of the case. Thus, according to the distance which the link is moved, the magnet on the slidable bar will set one or other of the indicator-members should the internal diameter of the case be found not to be within the desired limits.

At the end of some cartridge-cases there is a depression in which is located an anvil. When it is desired to gauge the internal diametrical dimensions of this depression, mechanism similar to that above described may be employed.

What I claim as my invention and desire to secure by Letters Patent is:

1. In apparatus for testing the internal dimensions of hollow articles, the combination with a support, of feelers mounted on said support for movement toward and away from each other to caliper the article, and means connected to said support and operable thereon to move said feelers within the article and thereafter to displace said feelers with respect to said support into calipering engagement with the article.

2. In apparatus for testing the internal dimensions of hollow articles, the combination with a support, of feelers mounted on said support for movement toward and away from each other to caliper the article, means mounting said support for movement to and from a position in which the feelers extend within the article, means limiting the movement of said support toward such position, and means connected to said support and operable thereon to move the support to locate the feelers within the article and thereafter to displace said feelers with respect to said support into calipering engagement with the article.

3. In apparatus for testing the internal dimensions of hollow articles, the combination with a support, of feelers mounted on said support for movement toward and away from each other to caliper the article, means mounting said support for movement to and from a position in which the feelers extend within the article, means limiting the movement of said support toward such position, means connected to said support and operable thereon to move the support to locate the feelers within the article and thereafter to displace said feelers with respect to said support into calipering engagement with the article, said last named means acting against said feelers to effect displacement of said support, and spring means urging said feelers toward each other and away from engagement with the article.

4. In apparatus for testing the internal dimensions of hollow articles, the combination with a pivoted support, of feelers pivotally mounted on said support for movement toward and away from each other to caliper the article, and means connected to said support and operable through said feelers to move said support to position said feelers within the article and thereafter to displace said feelers with respect to said support into calipering engagement with the article.

GEORGE FREDERICK PEMBROKE.